Sept. 22, 1959 C. PROTZE 2,905,813

INVERSE FEEDBACK IN TRANSMITTERS

Filed May 13, 1957

Inventor:
Curt Protze
By Eric D. Frankel
PATENT AGENT 2,905,813
Patented Sept. 22, 1959

2,905,813

INVERSE FEEDBACK IN TRANSMITTERS

Curt Protze, Berlin-Siemensstadt, Germany, assignor to Telefunken G.m.b.H., Berlin, Germany Application May 13, 1957, Serial No. 658,569

Claims priority, application Germany May 15, 1956

6 Claims. (Cl. 250—17)

The present invention relates to a transmitter circuit arrangement with means for cancelling of signal distortions.

It has been known to provide in amplitude modulated transmitters operating at high frequencies an inverse feedback of a voltage containing distortions occurring in said transmitter. The inverse feedback voltage is generally of a low frequency obtained from the transmitter output by demodulation of the modulated carrier, and is fed back to a stage of the modulator. The inverse feedback voltage may also be a high frequency voltage. In this case, the high frequency voltage is derived from a high frequency amplifier stage close to the output, for example, from the final stage, and is fed back to a preceding high-frequency stage. Such inverse feedback has a cancellation action with respect to amplifier distortions in the high frequency amplifier, although the distortions occurring in the modulation amplifier or in the modulator stage cannot thus be cancelled. The application of a high frequency inverse feedback is particularly difficult in short wave transmitters, since there is the risk that spurious oscillations will be generated which cannot be controlled, due to phase displacements within the band limits. If the inverse feedback voltage is a low frequency voltage, obtained at the transmitter output by demodulation, such a low frequency voltage can be applied to different stages of the transmitter cascade. This low frequency voltage can be fed to a stage of the modulation amplifier, to a stage of the high frequency amplifier or simultaneously to both. In the first instance, the modulation transformer serving as the output component of the modulation amplifier is connected with the inverse feedback circuit so that it becomes necessary to keep the phase displacement small at this point. This can be realized to a rather limited extent only by construction of a transformer coil having small distributed capacity which requirement increases the expense, particularly in case of plate modulation of the final stage.

In the second instance, such difficulty is avoided and the inverse feedback voltage is caused to act as a feedback modulation, for example, at the grid of the plate modulated final stage or at the grid or the plate of a preceding stage.

The present invention relates to the latter instance, and uses a feedback modulation with a low frequency voltage derived from the modulated high frequency carrier to decrease distortions. Known circuits of this kind have the disadvantage that small distortions cannot efficiently be eliminated at low expense. If the transmitter must have a high efficiency and be constructed at moderate expense, such requirements can generally be fulfilled only by tolerating a slightly higher distortion level. Such practice is understandable in view of the fact that, increasing the efficiency and, at the same time, lowering the costs will lead to a decrease in the number of stages and to maximum output utilization of all of the stages with the result, that the modulation level must be increased above the optimum range of the characteristics of the tubes with respect to low distortions. In spite of the benefits obtained by the use of feedback modulation, a transmitter having very low distortion will be substantially more expensive and will have a lower total efficiency than a transmitter of the same output power with higher permissible distortion.

It is an object of the present invention to obtain a decrease in costs and an increase in efficiency in transmitters equipped with inverse feedback modulation.

It is another object of the invention to feed into two amplitude modulated high frequency transmitters at least two separately modulated energy components having substantially the same carrier phases and the same phases of the modulation voltages, the outputs being arithmetically combined in a common output circuit. Such common output circuits are known per se for the distribution of the composite energy from separate energy sources, as is pointed out in German Patent 861,865.

It is a still further object of the invention to modulate in one system a larger energy component, the system being designed to obtain a high output efficiency while permitting appreciable distortion, and a preferably smaller component is modulated in a second system to which a component of the distorted output is fed as a modulation voltage, whereby in the modulated composite output from both systems the distortions are substantially decreased with respect to those of the component obtained from the high efficiency first system.

The distribution of the composite total energy and the design of the said systems is preferably made in such a manner that the smaller energy component amounts to about 10% of the composite output energy.

In a particularly advantageous embodiment of the invention, the modulation voltage fed to the said second system is obtained by demodulation of the output containing the distortions to be cancelled, preferably of the output of the said first system or of the modulated composite of all of the output components. In order to avoid a feedback modulation containing undistorted components and to utilize the energy of the second system to the fullest extent for the cancellation of distortions, the inverse feedback voltage may be obtained by forming the difference between the voltage obtained by the said demodulation and the undistorted input modulation voltage. In this case, the phase position of the modulation voltage fed to the second system is adjusted in such a manner that the distortion component of the modulated carrier supplied from said second system to the common output circuit is opposite in phase to the distortion components contained in the carrier from the other system to the same output circuit.

Circuit arrangements with feedback modulation by means of distorted voltages have been known per se, see for example German Patent 869,225.

The advantage derived from the invention is that the system furnishing a larger component of the total energy, for example, one of two transmitters connected to a common load can be designed without regard to distortion and with emphasis on high efficiency with a small number of stages. Larger non-linear distortions may be permitted, whereby the modulation limits of the individual stages are widened. Thus, it is possible to employ high-gain stages and lower quality modulation transformers. Substantial savings can be obtained in case of a large transmitter, the main part of which can be simplified in the manner described. These savings are not lost in the additional means necessary for cancelling the distortions, because, generally, these additional means can be designed to operate at smaller energy levels. If for other reasons, such as protection against interruption of the transmission or for increase in output, an apparatus has been designed with several master oscillators operating independently from one another, the extent of the total distortion can be substantially decreased by equipping one of the oscillators with a feedback modulation according to the invention, but no changes in the other oscillator are necessary. Frequently, it will be possible to operate these oscillators with increased modulation and at increased efficiency. An improvement can be obtained in one or the other direction by applying the invention to older apparatus with only a single master oscillator having relatively large distortions or inferior efficiency if, in addition to the oscillator present, an auxiliary oscillator, designed for only a fraction of the total energy, is provided which includes the present feedback modulation of the distortion components.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 1:
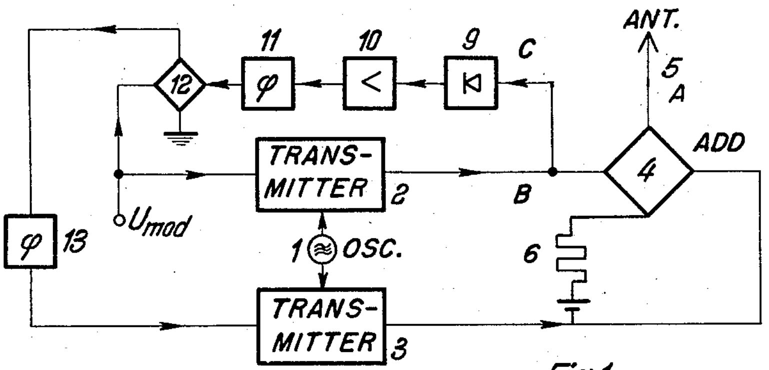
Figure 1 illustrates schematically a block diagram of a circuit arrangement according to the invention.

Referring in more detail to the drawings, in Figure 1, 1 denotes a stable high frequency crystal controlled oscillator serving as the master for two separate transmitter systems 2 and 3. Each of these systems comprises a multi-stage high frequency amplifier and an amplitude modulator for modulating the amplitude of the high frequency carrier, the transmitter system 2 being modulated as a function of the modulation voltage $U_{mod}$ and the transmitter system 3 being modulated with a correction modulation as described below. The output energies of the two transmitter systems 2 and 3 are conducted to an impedance network 4 in the direction indicated by the arrows, whereby this impedance network 4 serves to add the two energy components to one another to form a composite output. The impedance network 4 may be of the kind described in German Patent 861,865.

An antenna 5 for radiating the composite output is connected to the impedance network 4. A balancing resistance 6 grounded at one of its ends is connected at its other end to the impedance network 4. A part of the output energy of the two transmitter systems 2 and 3 will be lost in the resistance 6 if the output from one or the other of these transmitter systems is distorted. A feedback modulation circuit serves to cancel the linear and non-linear distortions produced in the transmitter system 2, said modulation circuit comprising the components 9 to 13, inclusive, indicated in Figure 1 as blocks. A conductor connecting the output of the system 2 producing the distortions is connected to the input of the component 9, in which a demodulation by linear rectifying action takes place. The low frequency voltages obtained thereby are conducted via the low frequency amplifier 10 and the phase shifting member 11 to an input of an impedance network 12 generally designed as a bridge. In this impedance network 12, the difference between the voltage derived from the components 9, 10 and 11 and the undistorted modulation voltage $U_{mod}$ is formed. The resulting low frequency voltage derived from the impedance network 12 thus contains only the distortion components, for example, higher harmonics generated by non-linearities or external disturbances such as hum, while the undistorted modulation components are balanced out by the modulation voltage $U_{mod}$. In the output voltage of the impedance network 12, there are also present voltages which are components of $U_{mod}$ resulting from failure to balance out in the network 12 those components which were lost during the modulation of the transmitter system 2, for example, due to narrowing of the band pass, causing losses in the lower and higher modulation components. While feedback is modulated on the carrier of the transmitter system 3, using the distortion components produced in the transmitter system 2, the transmitter system 3 is also modulated with the above modulation components which were omitted from the modulation of the transmitter system 2. Care is taken for proper adjusting of the phases of the modulation voltages by means of the phase shifting member 13.

In Figure 1 as an alternative connection the input at C of the demodulator 9 can be moved from point B to point A on the antenna 5. This connection at A, replacing the connection at B to the demodulator 9, has the advantage that distortions introduced by the transmitter system 3 are also cancelled.

Figure 2:
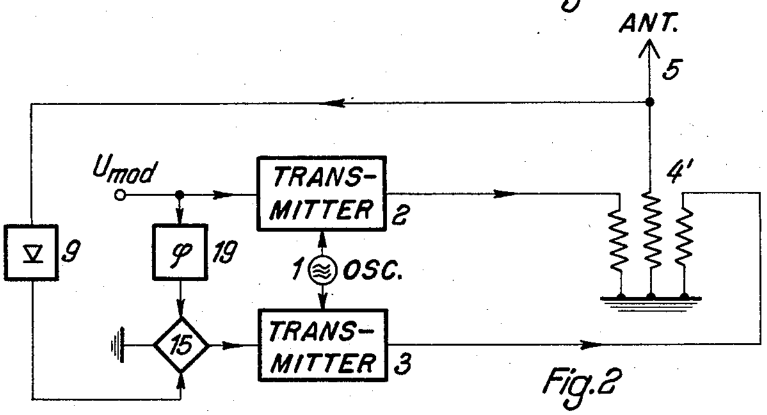
Figures 2 and 3 illustrate likewise block diagrams of two different modified arrangements, showing two other embodiments of the invention.

A similar action is obtained in the circuit of the embodiment of Figure 2, wherein the same reference numerals as in Figure 1 are used for like parts. The modulation voltage $U_{mod}$ is likewise directly fed to the transmitter system 2, as in the case of Figure 1. This transmitter system 2 supplies likewise the main component of the composite output supplied to the antenna, while the transmitter system 3 is connected also to the antenna via a coupling means 4' without inserting a bridge-like impedance network as in Figure 1. The modulation voltage is fed to the input of an impedance network 15 via a phase shifter 19, whereby the difference between the distorted modulation voltage derived from the antenna 5 via the demodulator 9 and the original modulation voltage $U_{mod}$ is formed in the impedance network 15. Thus, a distortion modulation voltage resulting from unbalance in the network 15 is fed to the transmitter system 3, much as described with reference to Figure 1.

Figure 3:
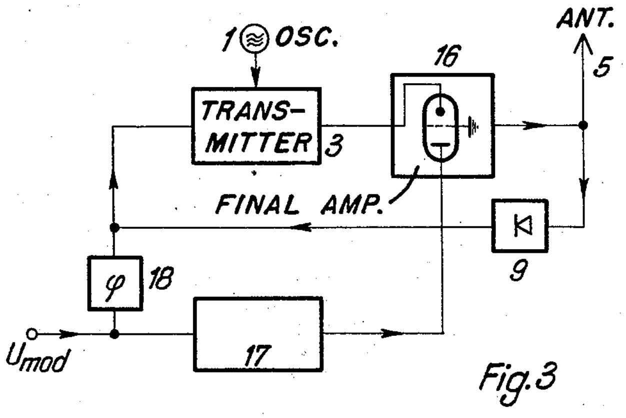

In the system according to Figure 3, the two separately modulated transmitter systems are arranged in series with respect to the output load into which they work, rather than in parallel. This circuit is provided with a separate final stage 16 which is the common output load, whereby this stage is designed in the form of a grounded-grid system. In this final stage, the high frequency oscillation derived from the master oscillator 1 and amplified in the high frequency transmitter system 3 is supplied to the cathode circuit of the final stage 16. The modulation signal amplified in the modulation amplifier 17 is fed to the plate circuit of the same stage 16. It has been known that in final transmitter stages of the grounded-grid plate-modulated type, a certain portion of the excitation energy supplied to the cathode circuit appears unmodulated in the output circuit. Therefore, in the stage 16, there is obtained an additive combination of two energy components as in the impedance network 4 and in the coupling means 4' of the circuits described in connection with Figures 1 and 2, respectively. Thus, in the final stage 16 of Figure 3, performance similar to that of the said means according to Figures 1 and 2 is obtained. In the application of the invention, modulation on the anode of the final stage 16 is considered analogous to that of the transmitter system 2 of the figures described in the foregoing, i.e., certain distortions are tolerated at this point. The additional modulation to cancel these distortions takes place in the transmitter system 3 via the phase shifter 18, said system 3 preceding the final stage 16. For this purpose, a suitable voltage is derived from the antenna 5 via the demodulation means 9 and is supplied to the input of the transmitter system 3. A particularly economical embodiment of a circuit arrangement according to the invention is obtained by this kind of system.

I claim:

1. A transmitter circuit arrangement adapted to provide an output signal which is the composite of components respectively from a first and a second transmitter system, and all components combined in an output network, both transmitter systems having a carrier derived from a single stable source and each having a modulator for amplitude-modulating its carrier, the arrangement comprising said first transmitter system designed for efficient high-output operation with appreciable distortion and modulated by a portion of a signal derived from a modulation source, and said second transmitter system designed for lower output; and a distortion-correction circuit comprising a linear demodulator connected with said output network, a comparison network connected with said demodulation to receive a portion of the output thereof and connected with said modulation source to receive a portion of said signal which modulates the first transmitter system, and said comparison network delivering to the modulator of the second transmitter system a distortion-voltage resulting from the comparison of the said portions, a phase shifter connected in said distortion-correction circuit for adjusting the distortion-voltage delivered to the modulator in said second transmitter system in such phase that the modulation distortion on the output of the first transmitter system will be substantially decreased by the presence in the output network of the component supplied by the second transmitter system.

2. In a circuit arrangement as set forth in claim 1, the power capability of the second transmitter system amounting to approximately 10% of the output power capability of the entire arrangement.

3. In a circuit arrangement as set forth in claim 1, said linear demodulator being connected with said output network at a point containing components of both transmitter systems to demodulate a portion of said composite output oscillation containing distortion components introduced by both transmitter systems.

4. In a circuit arrangement as set forth in claim 1, said linear demodulator being connected with said output network at a point containing only components from the first transmitter system to demodulate only a portion of the output component of said first transmitter.

5. In a circuit arrangement as set forth in claim 1, said phase shifter having characteristics such so that the phase of the distortion-voltage modulation on the output carrier of the second transmitter system will be opposite to the phase of the distortion components of the output of the first transmitter system and will substantially cancel therewith in the output network.

6. In a circuit arrangement as set forth in claim 1, said output network comprising a final amplifier having a grounded grid, having a plate excited and modulated by said first transmitter system, and having a cathode energized by the modulated output component from said second transmitter system.

References Cited in the file of this patent

UNITED STATES PATENTS

| | | |
|---|---|---|
| 1,999,190 | Hansell | Apr. 30, 1935 |
| 2,091,701 | Cravath | Aug. 31, 1937 |
| 2,093,751 | DeWitt | Sept. 21, 1937 |
| 2,672,589 | McLeod | Mar. 16, 1954 |